United States Patent [19]
Radler et al.

[11] Patent Number: 5,625,915
[45] Date of Patent: May 6, 1997

[54] LAUNDRY OZONE INJECTION SYSTEM

[75] Inventors: Michael S. Radler, Norristown, Pa.; Jerry W. Humphreys, Kansas City, Mo.

[73] Assignee: Cyclo3PSS Textile Systems, Inc., Salt Lake City, Utah

[21] Appl. No.: 462,132

[22] Filed: Jun. 5, 1995

Related U.S. Application Data

[63] Continuation of Ser. No. 315,682, Sep. 30, 1994, abandoned, which is a continuation of Ser. No. 61,686, May 14, 1993, abandoned.

[51] Int. Cl.$^6$ .................................................. D06F 39/08
[52] U.S. Cl. .......................... 8/158; 68/207; 68/12.12; 68/12.02
[58] Field of Search ......................... 68/207, 12.12, 68/12.02, 13 R; 8/158; 422/186.07, 186.12

[56] References Cited

U.S. PATENT DOCUMENTS

| | | | |
|---|---|---|---|
| 1,096,991 | 5/1914 | Blanchard | 422/186.12 |
| 1,823,352 | 9/1931 | Crespi et al. | |
| 2,189,017 | 2/1940 | Rivat | |
| 2,529,802 | 11/1950 | Glass | |
| 3,065,620 | 11/1962 | Houser | 68/13 R |
| 3,130,570 | 4/1964 | Rentzepis | 68/13 R |
| 3,194,628 | 7/1965 | Cannon | 68/13 R |
| 3,226,842 | 1/1966 | Morey | |
| 3,916,652 | 11/1975 | Speakman | |
| 4,214,330 | 7/1980 | Thorsen | |
| 4,283,251 | 8/1981 | Singh | |
| 4,300,367 | 11/1981 | Thorsen | |
| 4,675,023 | 6/1987 | Hyink | |
| 4,881,941 | 11/1989 | Dixon | |
| 4,966,717 | 10/1990 | Kern | |
| 5,014,211 | 5/1991 | Turner et al. | 68/207 |
| 5,053,140 | 10/1991 | Hurst | |
| 5,097,556 | 3/1992 | Engel et al. | 8/158 |
| 5,107,605 | 4/1992 | Yamada et al. | |
| 5,118,322 | 6/1992 | Wasinger et al. | |
| 5,123,176 | 6/1992 | Yamada et al. | |
| 5,207,237 | 5/1993 | Langford | 134/102.1 |
| 5,213,773 | 5/1993 | Burris | |
| 5,241,720 | 9/1993 | Engel et al. | |
| 5,261,925 | 11/1993 | Wasinger et al. | |
| 5,313,811 | 5/1994 | Wasinger et al. | |

FOREIGN PATENT DOCUMENTS

| | | | |
|---|---|---|---|
| 497247 | 8/1992 | European Pat. Off. | 134/902 |
| 593933 | 9/1925 | France | |

OTHER PUBLICATIONS

Quotation Number: 91–028B dated Feb. 5, 1992 (6 pages).
Exhibit A —Purchase Order No. 3153 from American Linen Supply Co., dated Feb. 12, 1992.
Exhibit B —Invoice No. 148002 dated Jun. 4, 1992 invoicing the final payment for the ozone installation at the AlSCO Mankato.

(List continued on next page.)

Primary Examiner—Frankie L. Stinson
Attorney, Agent, or Firm—Trask, Britt & Rossa

[57] ABSTRACT

A laundry ozone injection system includes an ozone generator connected to an ozone distribution manifold having a plurality of manifold outlets connected through ozone valves to ozone injectors associated with washing machines of a laundry plant. Each washer has water cycled therefrom by a pump, through the ozone injector, and back to the washer chamber. A washer cycle controller of each washer is interfaced to a local interface module along with a pump motor. The local interface modules are interfaced to an ozone distribution controller or main controller which is also interfaced to the ozone valves. The current washer cycle of each machine is detected by its local interface module and communicated to the main controller which controls the rate of ozone production of the ozone generator, the activation of the pump motor, and the opening of the ozone valve of a washer in accordance with the currently detected washer cycle to thereby control the delivery of ozone to the washer.

20 Claims, 3 Drawing Sheets

OTHER PUBLICATIONS

Exhibit C —Invoice No. 149154 dated Jul. 23, 1992 charging travel expenses for 2 men. One week: Second 1 man. One week for the purpose of installing ozone washing at Mankato plant.

Exhibit D —Invoice No. 149153 dated Jul. 23, 1992 charging for freight and handling for ozone generator and associated parts to Mankato plant.

Exhibit E —Invoice No. 151015 dated Sep. 3, 1992, invoicing an ozone monitor for the Mankato system.

Exhibit F —Invoice No. 151104 dated Sep. 22, 1992 invoicing 2 pump motors and 7 mechanical pumps seals.

Exhibit G —Invoice No. 151171 dated Sep. 25, 1992 invoicing certain warranty work.

Exhibit H —Invoice No. 152095 dated Oct. 28, 1992 invoicing certain warranty work.

Exhibit I —Invoice No. 155004 dated Dec. 10, 1992 invoicing certain warranty work.

Exhibit J —Invoice No. 156047 dated Jan. 18, 1993 invoicing a one and a quarter stainless check valve was invoiced for the Mankato system.

Exhibit K —Invoice No. 157213 dated Feb. 19, 1993 invoicing 80' of one and a half nylo–brade PVC hose for the Mankato system.

Exhibit L —Invoice No. 158128 dated Mar. 26, 1993 invoicing a two oz. tube of Krytox for the Mankato system.

Exhibit M —Invoice No. 159002 dated Apr. 5, 1993 invoicing four 1–1/4" ×½ 304 stainless steel bushings, four 1–¼" stainless steel/Viton ball check valves for the Mankato system.

Exhibit N —Invoice No. 159003 dated Apr. 5, 1993 invoicing four 1–¼" ×½ 304 stainless steel bushings, four 1–¼" stainless steel/Viton ball chekc valves for the Mankato system.

Exhibit O —Invoice No. 159377 dated May 17, 1993 invoicing 20 feet of 1" PVC nylo–brade hose, 2 flowmeter float springs inlets, and 2 flowmeter float springs outlets for the Mankato system.

Exhibit P —Invoice No. 159406 dated May 24, 1993 invoicing EE control starter (120V coil with overload).

Jodlowski et al., "Possibilities Of Decolorization of Dye Wastes From The Textile Industry Using The Ozonation Method", Przeglad Wlokienniczy: 1979, pp. 37–39, pp. Engl. Tr. 1–13, 1979.

Kurbiel, "Removal Of Color, Detergents, And Other Refractory Substances From Textile Wastewater", EPA–600/2–78–072, pp. i–xiv, pp. 248–314, Mar. 1978.

Laundry Logic, Inc., "Laundry Logic Ozone Injection Systems", Bulletin No. OM105 pp. 1–6, 16 pages of table.

Nazarov et al., "Ozonization Of Waste (Sewage) In Textile Industry", Tekstilnaia promushlennost, pp. 1–13 and 52–56, Jun. 1984.

Rice et al, "Analytical Aspects of Ozone Treatment Of Water and Wastewater", Lewis Publishers, Inc., pp. 41–90, 129–159, and 245–255, 1986.

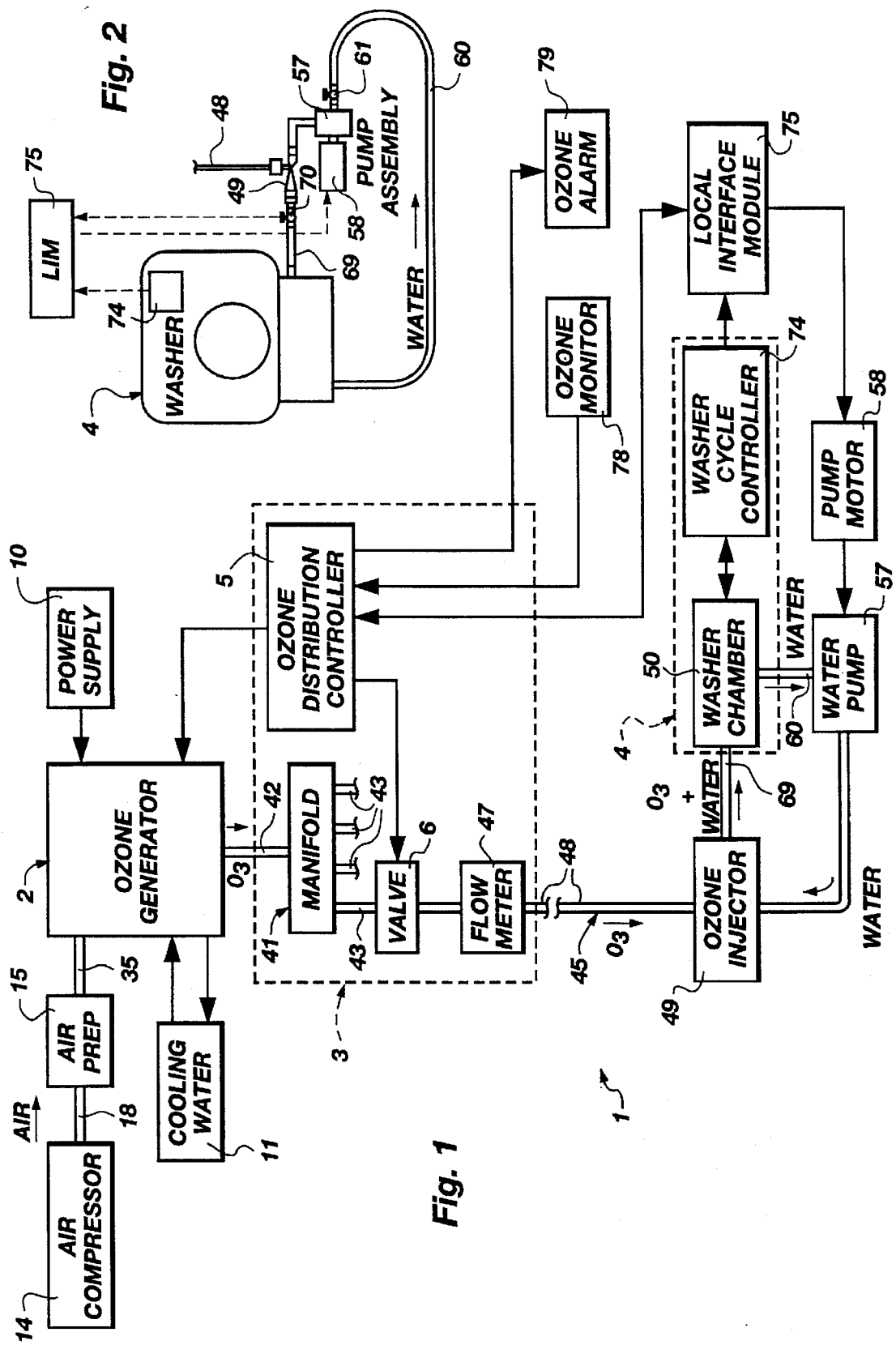

LAUNDRY OZONE INJECTION SYSTEM

This application is a continuation of application Ser. No. 08/315,682, filed Sep. 30, 1994 now abandoned which application is a continuation of application Ser. No. 08/061,686, filed May 14, 1993 now abandoned.

BACKGROUND OF THE INVENTION

The present invention relates to the use of ozone to increase the efficiency of the laundry wash process and, more particularly, to controlling the delivery of ozone to washing machines according to the current washer cycles of the machines.

Ozone ($O_3$) is a triatomic allotrope of oxygen in which the ozone molecule consists of three oxygen atoms in contrast to the two oxygen atoms which comprise the typical oxygen molecule ($O_2$). Ozone can be generated by passing air or oxygen through a high intensity electric field. Some of the oxygen molecules will be energized and will split into two separate atoms. These individual oxygen atoms will then form weak bonds with other oxygen molecules. The ozone molecule is oxygen in a highly reactive form. It has a tendency to give up its extra oxygen atom and gain electrons. This molecular structure gives ozone its high oxidizing power which allows ozone to react rapidly with a large variety of compounds.

Ozone has been used in the treatment of drinking water for over eighty years and has gained widespread use in the water treatment industry largely from the fact that it is the second most powerful oxidant known. This fact results in three distinct uses of ozone: the control of pollutants, as a sterilant for microorganisms, and in deodorization. Ozone has also been used in the laundry industry.

Ozone acts as a positively charged molecule that is electron deficient. Organic and hydrocarbon stains such as greases, fats, and oils have centers of high electron density and carry a negative charge. When ozone is injected into a washing machine, it is attracted to these molecules. It then reacts chemically with the soil in an oxidation process. The kinetics of the reaction between soil and ozone is very high; thus, the reaction between these two substances is extremely fast. The ozone will begin to react within a fraction of a second after contact. In the process the ozone will give up its third oxygen atom which will chemically bond with the soil molecule. An oxygen atom is highly electronegative and when added to a soil molecule, the electronegative charge will cause the chemical double bond of the molecule to polarize (reverse charge). Polarization will cause a large soil molecule to fragment into several smaller molecules. The strength of attachment between soil and a textile is largely a function of the size of the soil molecule. Smaller soil molecules will be more easily removed from the textile. The size of the molecule also has a direct effect on the solubility of the soil whereby a reduction in size will greatly increase the amount of soil that is dissolved in the wash liquor.

Surfactants and alkalis are used in most laundry detergents. Their main purpose is to suspend soil by bonding with the soil molecules to prevent redeposition of the soil. However, surfactants also play a key role in loosening of the soil. Some soils can be removed from the textile surface by mechanical action and water alone, but the majority cannot. Thus, a major part of the role of the surfactant is to loosen soil from the textile. However, this task can also be accomplished by ozone. A primary purpose of ozone in laundry processing is to remove the soil from the textile through polarization. A secondary purpose is to oxidize the soil, making it more soluble and allowing for faster precipitation. Ozone is in a highly reactive gaseous form in laundry processing, allowing it to react with and remove soil at a greatly increased rate which accounts for a substantial reduction in processing time. For these reasons, excellent results can be achieved using ozone and only about half the amount of surfactants usually required.

Alkalis are used for controlling the pH and alkalinity of the wash water. They also bond with calcium and magnesium allowing the surfactants to react with soils more effectively. A problem occurs in that when the alkali bonds with the calcium and magnesium, it can no longer contribute to the washing process. However, when ozone comes in contact with the bonded alkali, it will oxidize the ions, causing the calcium and magnesium to form a precipitate. The alkali is then free to react again. Thus, when using ozone as a wash chemical, it is only necessary to use a small amount of alkali on heavy industrial soil and in the bleach cycle for pH control. Otherwise, it is not necessary to use any alkali with high concentration ozone washing.

The use of ozone in the laundry process reduces or eliminates the need for other laundry chemicals and finishing products such as antichlor, "sour", bactericides, and mildewcides. Antichlor is used to neutralize any residual chlorine bleach. Ozone oxidizes chlorine bleach and completely neutralizes it. For this reason, ozone is not used in a chlorine bleach cycle. However, since ozone has bleaching capability, the need for chlorine bleach is reduced and, consequently, the need for antichlor. Sour is used to neutralize the effects of alkali on the pH of the wash solution. Since the use of ozone greatly reduces the need for alkali, the need for sour is also reduced. The high oxidizing power of ozone will destroy bacteria quickly. Ozone is one of the most lethal and efficient killers of bacteria known, as will be detailed further below. Thus, the need for an additional bactericide is eliminated when ozone is used in laundry processing. Mildewcide is used to combat the growth of mildew on textiles. Although ozone is a highly effective agent in killing mildews, the effect of ozone is not persistent. Thus, mildewcide use may be necessary during seasons when mildews proliferate, although in greatly reduced quantities.

Ozone acts about 3000 times faster than chlorine as a bactericide and is the strongest oxidant commercially available for the treatment of water. Ozone has been used in the treatment of drinking water since 1906, when it was first installed in Nice, France. Ozone destroys bacteria, viruses, mold, fungi, and algae more effectively than any other biocide available for two reasons. Ozone has a much higher oxidation potential than chlorine, and its mechanism of kill is unique. Chlorine must first diffuse through the cell wall to kill the microorganism internally. This process can take 30 to 60 minutes. Reactivation of the cell can occur if contact time or concentration are not sufficient. Ozone, on the other hand, kills bacteria in just a few seconds by a process known as cell lysing. It molecularly ruptures the cell membrane and scatters the inner cytoplasm. Thus, ozone destroys the microorganisms and prevents them from developing ozone resistant strains, eliminating the need to periodically change bactericides.

Additional benefits from using ozone in laundry processing are dramatically increased washroom capacity due to decrease in processing or "formula" time, reduction in washroom labor, increased textile life, reduced water usage, and reduced utility consumption. The soil oxide is easier to remove and precipitate which allows for the use of greatly reduced break and suds events and the removal of some of the flushes. By using less chemicals, less rinsing is required to remove the chemicals. The reduction in the number of formula events results in a substantial decrease in water usage and a subsequent decrease in the gallonage discharged to sewers and a decrease in the concentration of COD, FOG, and TSS.

SUMMARY OF THE INVENTION

The present invention provides a practical system for distributing ozone to a plurality of washers, such as in an industrial or commercial laundry plant. An ozone generator receives compressed air which is dried and purified and generates ozone from a percentage of the oxygen therein. An ozone distribution manifold having a plurality of outlets is fluidically connected to the ozone generator and receives ozonated compressed air therefrom. An ozone valve set and a flow meter connect each manifold outlet to an ozone injector associated with a respective washing machine. Each ozone valve set includes a normally closed, compressed air actuated ozone valve which is connected to a manifold outlet and a normally closed solenoid valve which controls the flow of compressed air to the air actuated valve to operate same. The solenoid valves are interfaced to an ozone distribution or main controller which controls the operation of the ozone generator and the ozone valves through the solenoid valves.

Each washing machine has the washer cycles thereof controlled by an internal washer cycle controller. An external water pump is fluidically connected to the washer chamber of an associated washer and is operated during ozone injection to cycle water from the washer chamber, through an ozone injector, and back to the washer chamber to react with soils and stains in the wash load to thereby enhance the laundry process. The ozone injector is a venturi type device which feeds the ozonated compressed air into water traveling through the throat of the venturi to thereby entrain bubbles of the ozonated air in the water prior to its return to the washer chamber to react with soils and stains in the wash load to thereby enhance the laundry process. Each washer has a local interface module which interfaces with the washer cycle controller to detect the current cycle and to a pump motor which drives the pump. The local interface module is also interfaced to the main controller whereby the washer cycle is communicated thereto and control commands or signals are communicated from the main controller to the pump motor.

In normal operation, the main controller sets the ozone generator output level in relation to the washing requirements, activates the water pump motors, and opens the ozone valves to deliver water with ozone entrained therein to the washers only during selected washer cycles of the machines, such as wash and rinse cycles and, generally, any other cycles in which significant amounts of water are present in the washing machines. The ozone is consumed in chemical reactions in the laundry process and does not normally leak from the washers.

The system is preferably provided with one or more ozone detectors in the vicinity of the washers which are positioned to detect ambient ozone in the air about the washers. The ozone detectors are interfaced to the main controller whereby upon detecting excessive levels of ambient ozone, the main controller sounds an alarm, closes the ozone valve sets, and removes electrical power from the ozone generator to inhibit the delivery of ozone to the washing machines. By this means, workers in the vicinity of the washers are protected from exposure to excessive levels of ozone.

OBJECTS AND ADVANTAGES OF THE INVENTION

The principal objects of the present invention are: to provide an improved system for delivering ozone to laundry washers to enhance laundry processes therein, and particularly, for distributing ozone to a plurality of washers of an industrial or commercial laundry plant; to provide such a system for detecting the operating cycles of the washers and for delivering ozone to the washers only during selected washer cycles; to provide such a system including an ozone generator receiving compressed air and supplying the compressed air with ozone therein to a distribution manifold having ozone valves connecting a plurality of outlets thereof to the respective washers, the valves being interfaced to an ozone distribution controller which, along with local interface modules at the washers, detects the operating cycles of the washers and opens and closes the ozone valves in response to the detected washer cycles of the associated washers; to provide such a system wherein each washer has a pump cycling water therefrom through an ozone injector which entrains ozonated air into the water prior to its return to the washer; to provide such a system wherein each pump is interfaced to the ozone distribution controller and is activated in concert with the opening of the associated ozone valve; to provide such a system including an ozone monitor positioned in the vicinity of the washers and interfaced to the ozone distribution controller which closes the ozone valves and removes electrical power from the ozone generator in response to detection of excessive levels of ambient ozone; to provide such a system which can be installed in a great variety of commercial and industrial laundry plants; and to provide such a laundry ozone distribution system which is economical to manufacture, which is versatile and efficient in operation, and which is particularly well adapted for its intended purpose.

Other objects and advantages of this invention will become apparent from the following description taken in conjunction with the accompanying drawings wherein are set forth, byway of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 1 is a block diagram illustrating the principal components of laundry ozone injection system embodying the present invention.

FIG. 2 is a diagrammatic view of a washing machine station which receives ozone from the ozone injection system of the present invention.

DETAILED DESCRIPTION OF THE INVENTION

Figure 3:
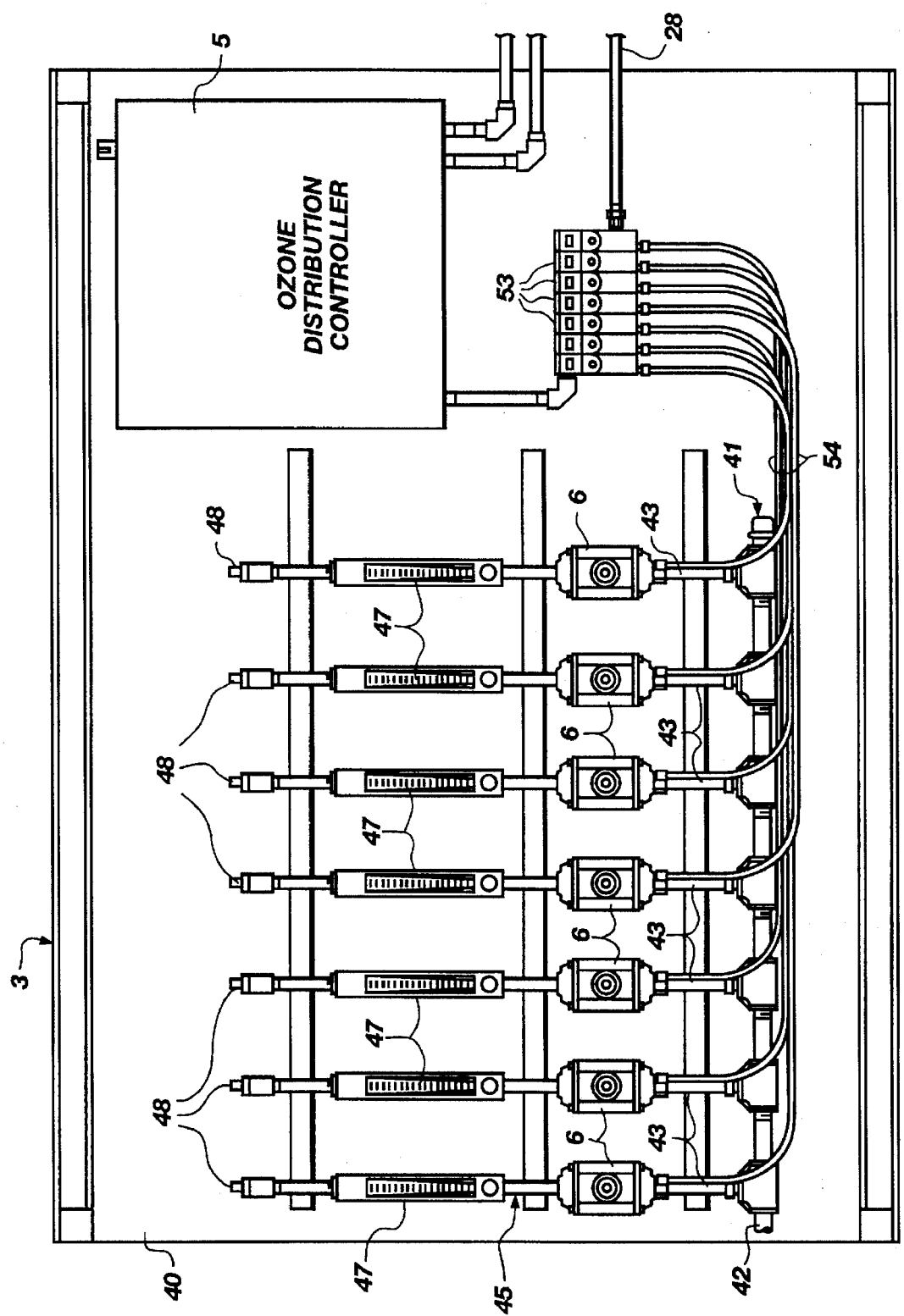
FIG. 3 is a front elevational view of a main panel of the ozone injection system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a laundry ozone injection system which embodies the present invention. The system 1 generally includes an ozone generator unit 2 and an ozone distribution panel 3 which cooperate to distribute ozone to a plurality of washing machines 4 to enhance the laundry process thereof. The distribution panel 3 includes an ozone distribution controller or main controller 5 which detects the washer cycles of the washers 4 and enables the delivery of ozone to the washers 4 only during selected washer cycles by controlling the state of ozone control valves 6.

The ozone generator 2 may be one of a number of devices for generating ozone from air or oxygen, and its required capacity depends on the number and size of the washers 4 installed in the washroom of the laundry facility and the types of laundry loads processed therein. An exemplary ozone generator 2 is the model G-28 manufactured by PCI Ozone and Control Systems, Inc. of West Caldwell, N.J. In general, the illustrated ozone generator 2 generates ozone by passing dry air or oxygen through a corona discharge produced by a high voltage at a high frequency which is applied to coaxial electrodes (not shown) within the generator 2. The electrode voltage is derived from three phase 460 volt power by an associated power supply 10, which has a current capacity of 30 amperes. The temperature of the generator 2 is controlled by cycling cooling water 11 through the electrodes.

The ozone output of the generator 2 can be controlled by the main controller 5 by an analog signal level therefrom. In general, the ozone output is controlled by controlling the frequency of the ozone generating power applied to the electrodes of the generator 2. The ozone output of the generator 2 may also be varied by controlling the voltage level of the applied power. The illustrated ozone generator 2 may be controlled to vary its ozone output from about ten per cent to full rated output. The main controller 5 also has the capability of completely disabling the generator 2 to entirely shut down the generation of ozone.

Figure 5:
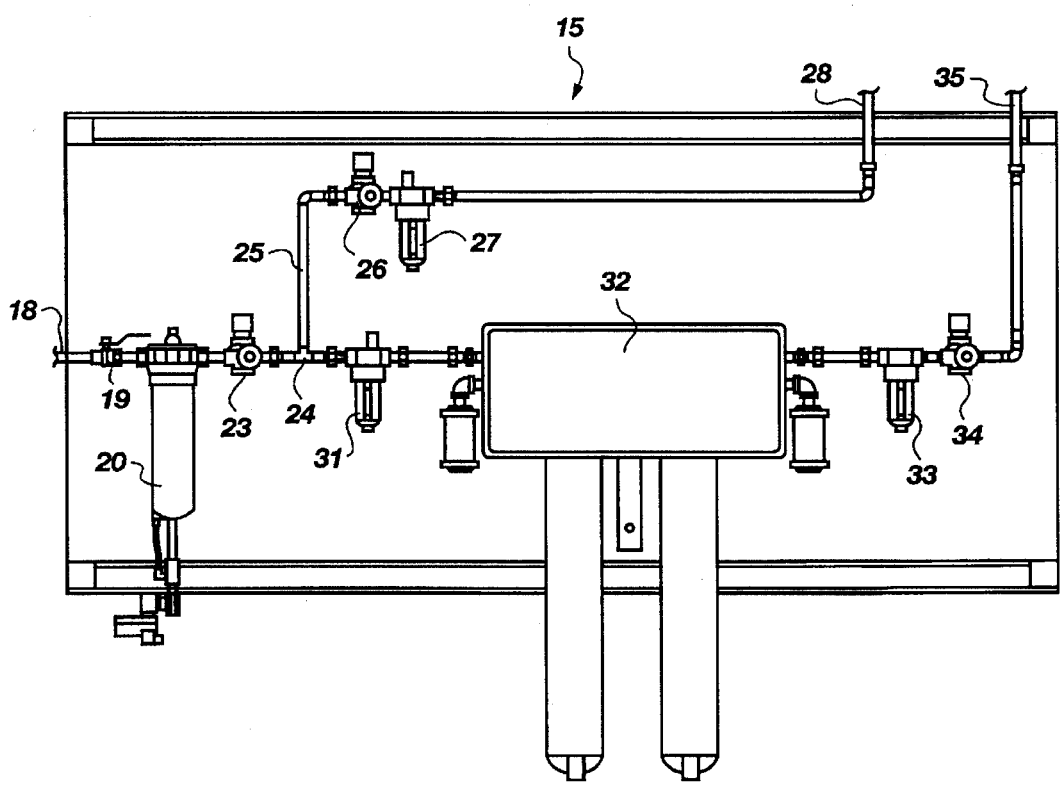
FIG. 5 is an elevational view of an air preparation unit of the ozone injection system of the present invention.

In the present invention, the ozone generator receives compressed air from an air compressor 14 through an air preparation unit 15 which filters and dries the air and regulates the pressure thereof. Referring to FIG. 5, the air preparation unit 15 receives compressed air from the compressor 14 at a flow rate of about 25 SCFM (standard cubic feet per minute) and at a pressure of 80–100 psi (pounds per square inch). A supply conduit 18 from the compressor 14 connects to a multiple stage pre-filter 19 through a manually operated ball valve 20. A first pressure regulator 23 regulates air pressure to a T-connector 24 at 80 psi. A branch conduit 25 from the connector 23 leads to a second 80 psi regulator 26, a lubricator 27, and an auxiliary conduit 28 which connects to the main panel 3 for a purpose which will be detailed below. The T-connector 24 also connects to a coalescing filter 31 and a twin regenerative air dryer 32 which removes moisture from the compressed air fed to the ozone generator 2. From the air dryer 32, the air passes through a general purpose filter 33 and a third regulator 34 to provide air at 15 psi to a main air supply conduit 35 which supplies air to the ozone generator 2.

The ozone distribution or main panel 3 (FIG. 3) includes a panel wall 40 supporting an ozone distribution manifold 41 which receives ozonated compressed air from a main ozone supply conduit 42 and makes it available to a plurality of manifold outlet conduits 43. Each outlet conduit 43 forms an ozone distribution circuit 45 between the panel 3 and a washer 4, one circuit 45 being illustrated diagrammatically in FIG. 1. It should be understood that the system I has the capability of accommodating a number of such circuits 45, depending on the ozone capacity of the ozone generator 2, the ozone requirements of the particular washers 4, and the ozone requirements for the types of laundry loads which the washers 4 are intended to clean.

Each ozone distribution circuit 45 includes one of the ozone valves 6, a flow meter 47, an ozone feed conduit 48, and an ozone injector 49 which fluidically connects to the washer chamber 50 of a washing machine 4. The illustrated ozone valves 6 are compressed air actuated ball valves, which have been determined to be the most appropriate type of valve for use as the valves 6 in the system 1. Other types of valves could, alternatively, be employed as the valves 6. Each valve 6 is operated by the main controller 5 through a respective solenoid operated valve 53. The ozone valves 6 and the solenoid valves 53 are normally closed. The solenoid valves 53 receive compressed air from the air preparation unit 15 by way of the auxiliary air conduit 28 and are interfaced to the main controller 45 whereby the valves 53 are individually opened to feed compressed air to the ozone valves 6 to open same to thereby feed ozone into the respective ozone feed conduits 48. The flow meters 47 may be conventional "rotameter" type flow meters and are calibrated to indicate a flow range of 1–10 SCFM. The illustrated flow meters 47 incorporate adjustable needle valves (not shown) to vary the flow rate therethrough according to the load capacity of the associated washers 4.

Figure 4:
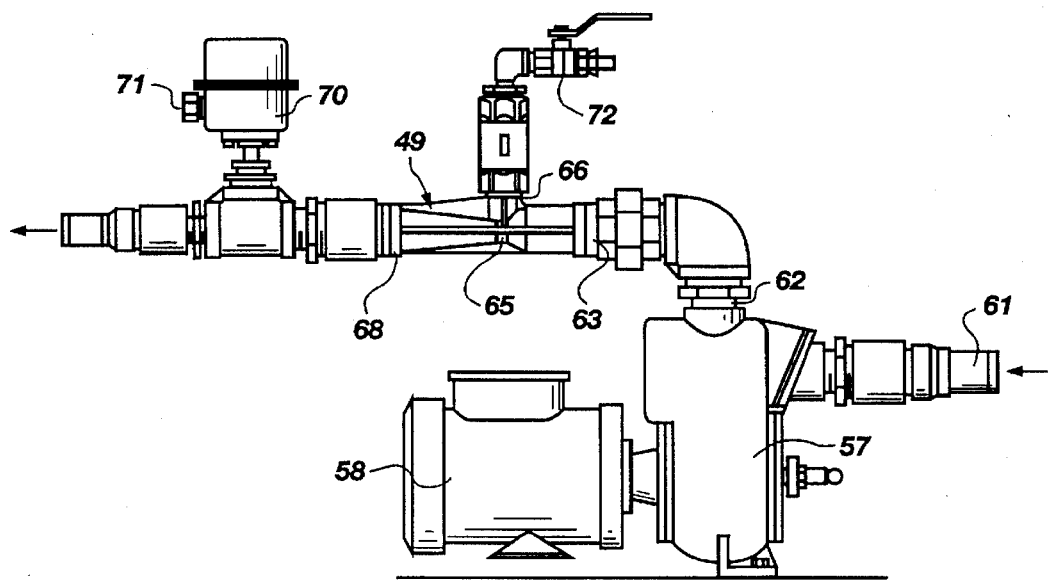
FIG. 4 is an enlarged side elevational view of an ozone injector assembly of the ozone injection system.

Referring to FIG. 1, each washing machine 4 has a water pump 57 which cycles water from the washer chamber 50 through the ozone injector 49 in which ozone is entrained in the water and back to the washer chamber 50. The pump 57 is a centrifugal pump and is driven by a pump motor 58 under control of the main controller 5. Referring to FIG. 4, the pump 57 receives water from a drain conduit or hose 60 through a pump intake connector 61. A pump outlet 62 is connected to a water feed connector 63 of the ozone injector 49. The ozone injector 49 is a venturi type of device in which a throat region 65 of reduced cross sectional area causes a drop in the pressure of fluid passing therethrough. An ozone feed connector 66 fluidically communicates with the throat region 65 and feeds ozonated compressed air thereinto.

As a result of the pressure differentials between the ozonated air and the water, the ozonated air is entrained in the water "explosively" as microbubbles, which increases the oxidizing effectiveness of the ozone in the washer chamber 50 over larger bubbles due to a relatively higher surface area per unit volume of the smaller bubbles. The smaller bubbles can, thus, dissolve a higher percentage of ozonated air in the water than larger bubbles for reaction with the soils and stains in the wash load.

The ozone injector 49 has an injector outlet 68 which is connected to a return conduit or hose 69 and which carries the water with ozonated air therein back to the washer chamber 50. A pressure switch 70 is mounted in the return line 69 and includes a cable connector 71 which is interfaced to the main controller 5 to signal that water under pressure is present in the return line 69. A manually operable ball valve 72 is positioned in the ozone feed conduit 48 and provides a means of positively cutting off the flow of ozone to the ozone injector 49, as for repair and maintenance of the washers 4 or if ozone leaks are detected.

The washers 4 are conventional industrial washing machines which are operated through various washer cycles under control of a washer cycle controller 74. Each washer 4 has a local interface module (LIM) 75 which is interfaced to the washer cycle controller 74, the pump motor 58, the pressure switch 70, and the ozone distribution controller 5. The module 75 provides a means of communication between the main controller 5 and the washer 4 by which the main controller 5 detects the current washer cycle and controls operation of the ozone valve 6 and the pump motor 58. The washer cycle controllers 74 in current operation range from electromechanical controllers in older models to digital and microprocessor controllers in more modern washers 4. Thus, the local interface modules 75 must be configured according to the general type of washer controller 74 employed and also to differences between the controllers 74 of various manufacturers thereof.

A local interface module 75 can detect the current washer cycle from washer cycle controllers 74 by detecting patterns of switch and relay states or patterns of logic states within the washer cycle controller 74. The interface module 75 can be made "intelligent" whereby the particular module 75 is programmed to interpret the patterns of switch, relay, or logic states, and merely communicates an enable or inhibit signal to the main controller 5. Alternatively, the interface module 75 may communicate more detailed data representing the logic patterns to the main controller 5 which then determines the current washer cycle. The ozone distribution or main controller 5 is preferably a programmable logic controller but may also be implemented as a personal type computer with appropriate interfacing and programming, or the like. The main controller 5 may be programmed to vary the ozone output of the ozone generator 2 according to the number and load capacity of washers 4 which are active at a given time.

In general, it is desirable to inject ozone into a washer chamber 50 whenever significant quantities of water are present, as during soak, wash, and rinse cycles. Additionally, it might be desirable to inject ozone into the washer chamber 50 during portions of fill and drain cycles. During such cycles, water is continuously recycled through the washer chamber 50 by the pump 57, and ozone is injected into the recycled water by the ozone injector 49. When a washer cycle in which ozone is to be injected is detected, the main controller 5 first activates the pump motor 58 and opens the associated solenoid valve 53 to cause opening of the associated ozone valve 6 whereby ozone is communicated from the manifold 41 to the ozone injector 49. At the end of a motor delay period to allow the pump 57 to reach a steady state flow rate, the controller 5 determines the state of the pressure switch 70 to determine that water is actually present in the ozone injector 49. If not, the controller 5 closes the valves 6 and activates an alarm. When the interface module 75 detects a washer cycle in which the injection of ozone is not desired, the flow of ozone from the manifold 41 is terminated by disabling the pump 57 and closing the valves 53 and 6.

Preferably, one or more ozone monitors 78 are positioned about the washroom having the washers 4 installed therein to detect excessive levels of ambient ozone in the washroom. The ozone monitors 78 are interfaced to the main controller 5 which may also have an ozone alarm 79 interfaced thereto. Upon detecting an excessive level of ambient ozone by the monitors 78, the main controller 5 disables the ozone injection process for all the washers 4 in washroom by disabling the ozone generator 2, and sounds the alarm 79 to alert workers.

Virtually all of the ozone injected into the washer chambers 50 is consumed in reacting with the soils and stains of the wash loads. Thus, the detection of excessive levels of ambient ozone usually implies a leak in the plumbing between the distribution panel 3 and the washers 4. The number and placement of ozone monitors 78 in a laundry washroom is generally determined by the size and airflow patterns therein. Since excessive concentrations of ozone are considered hazardous to humans, the detection of excessive ozone levels requires that the source of the excess ozone or leak be found and repaired before normal operation of the washers 4 is resumed.

It is to be understood that while certain forms of the present invention have been illustrated and described herein, it is not to be limited to the specific forms or arrangement of parts described and shown.

What is claimed and desired to be secured by Letters Patent is as follows:

1. An ozone delivery system for delivering ozone to a washing machine having a washer chamber and a washer cycle controller causing said washing machine to operate through a plurality of washer cycles, said ozone delivery system comprising:

an ozone generator generating ozone;

an ozone valve fluidically communicating with said ozone generator and said washing machine, said ozone valve being operable to control communication of said ozone therethrough to said washer chamber; and an ozone controller interfaced with said ozone generator, washer cycle controller, and said ozone valve, detecting a current washer cycle, and causing said ozone valve to open to communicate a selective amount of said ozone to said washer chamber in response to detecting a selected washer cycle of said washing machine.

2. A system as set forth in claim 1 for delivering ozone to a plurality of washing machines further including:

a manifold fluidically communicating with said ozone generator and having a plurality of manifold outlets;

a plurality of ozone valves, each ozone valve controlling fluid communication between a manifold outlet and a respective washer chamber; said ozone controller being interfaced with each washer cycle controller and each ozone valve, detecting a current washer cycle of each washing machine, and causing each ozone valve to open to communicate ozone to the associated washer chamber upon detecting a selected washer cycle of the associated washing machine.

3. A system as set forth in claim 1 further including:

a pump cycling liquid from said washer chamber back to said washer chamber; and an ozone injector fluidically connected to said ozone valve to receive ozone therefrom and fluidically connecting said pump to said washer chamber, said ozone injector entraining ozone in said liquid being cycled to said washer chamber.

4. A system as set forth in claim 3 wherein:

said pump is interfaced with said ozone control; and said ozone controller is operative to activate said pump in cooperation with opening said ozone valve in response to detecting said selected washer cycle of said washing machine.

5. An ozone delivery system for delivering ozone to a washing machine having a washer chamber and a washer cycle controller causing said machine to operate through a plurality of washer cycles, said system comprising:

(a) ozone generator means for generating ozone;

(b) ozone valve means fluidically communicating with said ozone generator means and said washing machine, said ozone valve means being operable to control communication of said ozone therethrough to said washer chamber;

(c) ozone control means interfaced to said ozone generator means, said washer cycle controller, and said ozone valve means, for detecting a current washer cycle, and causing said ozone valve means to open to communicate said ozone to said washer chamber in response to detecting a selected washer cycle of said washing machine;

(d) ozone monitor means positioned in spaced relation to said washing machine, interfaced to said ozone control means, for detecting a level of ambient ozone in a vicinity of said washing machine; and (e) said ozone control means disabling said ozone generator means to stop production of ozone entirely upon said ozone monitor means detecting a level of ambient ozone exceeding a selected level.

6. An ozone delivery system for delivering ozone to a plurality of washing machines, each said washing machine having a washer chamber and a washer cycle controller causing said washing machine to operate through a plurality of washer cycles, said ozone delivery system comprising:

an ozone generator receiving compressed air and generating ozone therein;

a manifold fluidically communicating with said ozone generator and having a plurality of manifold outlets;

a plurality of ozone valves, each said ozone valve controlling fluid communication between a manifold outlet and a respective washer chamber; and an ozone controller interfaced with said ozone generator, each washer cycle controller, and each ozone valve, detecting a current washer cycle of each washing machine, and causing each ozone valve to open to communicate ozone to the associated washer chamber upon detecting a selected cycle of the associated washing machine independent of the ozone requirement of any other washing machine.

7. The ozone delivery system of claim 6 wherein each washing machine includes:

a pump cycling liquid from said washer chamber back to said washer chamber; and an ozone injector fluidically connected to the associated ozone valve to receive ozone therefrom and fluidically connecting said pump to said washer chamber, said ozone injector entraining ozone in said liquid being cycled to said washer chamber.

8. The ozone delivery system of claim 7 wherein:

said pump interfaces with said ozone controller; and said ozone controller is operative to activate said pump in cooperation with opening the associated ozone valve in response to detecting said selected washer cycle of the associated washing machine.

9. A system as set forth in claim 6 wherein:

(a) each of said ozone valves is a compressed air operated ball valve.

10. An ozone delivery system for delivering ozone to a plurality of washing machines, each of said washing machine having a washer chamber and a washer cycle controller causing said washing machine to operate through a plurality of washer cycles, said system comprising:

(a) ozone generator means receiving compressed air and generating ozone therein;

(b) manifold means fluidically communicating with said ozone generator means and having a plurality of manifold outlets;

(c) a plurality of ozone valves, each said ozone valve controlling fluid communication between a manifold outlet and a respective washer chamber;

(d) ozone control means interfaced to said ozone generator means, each washer cycle controller, and each ozone valve, detecting a current washer cycle of each washing machine, and for causing each ozone valve to open to communicate ozone to the associated washer chamber upon detecting a selected cycle of the associated washing machine;

(e) ozone monitor means positioned in spaced relation to said washing machines, interfaced to said ozone control means, and detecting a level of ambient ozone in a vicinity of said washing machines; and (f) said ozone control means disabling said ozone generator means to inhibit communication of ozone to said washing machines upon said ozone monitor means detecting a level of ambient ozone exceeding a selected level.

11. An ozone delivery system as set forth in claim 6 wherein:

said ozone controller operates to adjust a rate of ozone production by said ozone generator according to washing requirements of said washing machines.

12. A method for delivering ozone to a washing machine including a washer chamber and capable of operating in a plurality of washer cycles, said method comprising the steps of:

(a) generating ozone;

(b) providing a controllable ozone valve through which said ozone is fluidically communicated to said washing machine;

(c) automatically detecting the current washer cycle of said washing machine; and (d) automatically controlling said ozone valve to enable communication of a selective amount of said ozone therethrough in response to detecting a selected washer cycle of said washing machine.

13. A method as set forth in claim 12 for delivering ozone to a plurality of washing machines and comprising the steps of:

providing a manifold having a plurality of manifold outlets and receiving said ozone;

fluidically connecting each of said manifold outlets to a respective controllable ozone valve;

fluidically connecting each ozone valve to a respective washing machine;

automatically detecting the current washer cycle of each washing machine; and automatically controlling the ozone valve associated with a respective washing machine to enable the communication of said ozone thereto in response to detecting a selected washer cycle of the associated washing machine.

14. A method as set forth in claim 12 and including the step of:

cycling liquid from said washer chamber through an ozone injector back to said washer chamber by a pump, said ozone injector being fluidically connected to said ozone valve to thereby inject ozone into said liquid.

15. A method as set forth in claim 14 and including the step of:

activating said pump in cooperation with controlling said ozone valve to enable communication of ozone therethrough in response to detecting said selected washer cycle.

16. A method for delivering ozone to a washing machine including a washer chamber and capable of operating in a plurality of washer cycles, said method comprising the steps of:

(a) generating ozone:

(b) providing a controllable ozone valve through which said ozone is fluidically communicated to said washing machine;

(c) automatically detecting the current washer cycle of said washing machine;

(d) automatically controlling said ozone valve to enable communication of said ozone therethrough in response to detecting a selected washer cycle of said washing machine;

(e) monitoring the level of ambient ozone in a vicinity of said washing machine; and (f) ceasing to generate ozone to inhibit the communication of ozone to said washing machine in response to detecting a level of ambient ozone exceeding a selected level.

17. A method for delivering ozone to a plurality of washing machines, each said washing machine having a washer chamber and a washer cycle controller causing said washing machine to operate through a plurality of washer cycles, said method comprising the steps of:

generating ozone from compressed air;

providing a manifold having a plurality of manifold outlets and receiving said ozone;

fluidically connecting each of said manifold outlets to a respective controllable ozone valve;

fluidically connecting each ozone valve to a respective washing machine;

automatically detecting the current washer cycle of each washing machine; and automatically controlling the ozone valve associated with a respective washing machine to enable the communication of said ozone thereto in response to detecting a selected washer cycle of the associated washing machine independent of the ozone requirement of any other washing machine.

18. A method as set forth in claim 17 and further including the step of:

cycling liquid from each washer chamber through an ozone injector back to said washer chamber by a pump, said ozone injector being fluidically connected to the ozone valve associated with said washer chamber to thereby inject ozone into said liquid.

19. A method as set forth in claim 18 and further including the step of:

activating said pump in cooperation with controlling said ozone valve to enable communication of ozone therethrough in response to detecting said selected washer cycle.

20. A method for delivering ozone to a plurality of washing machines, each washing machine having a washer chamber and a washer cycle controller causing said washing machines to operate through a plurality of washer cycles, said method comprising the steps of:

(a) generating ozone from compressed air;

(b) providing manifold means having a plurality of manifold outlets and receiving said ozone;

(c) fluidically connecting each of said manifold outlets to a respective controllable ozone valve;

(d) fluidically connecting each ozone valve to a respective washing machine;

(e) automatically detecting the current washer cycle of each washing machine;

(f) automatically controlling the ozone valve associated with a respective washing machine to enable the communication of said ozone thereto in response to detecting a selected washer cycle of the associated washing machine;

(g) monitoring the level of ambient ozone in a vicinity of said washing machines; and (h) ceasing to generate ozone to inhibit the communication of ozone to said washing machines in response to detecting a level of ambient ozone exceeding a selected level.

* * * * *

UNITED STATES PATENT AND TRADEMARK OFFICE
CERTIFICATE OF CORRECTION

PATENT NO. : 5,625,915
DATED : May 6, 1997
INVENTOR(S) : Radler et al.

It is certified that error appears in the above-identified patent and that said Letters Patent is hereby corrected as shown below:

Items [75] and [56]
On Title page, under "Inventors", Radler's address should read Tuscon, Arizona;

On Title page, under "Other publications" line 5, change "A1SCO" to --ALSCO--;

On Title page, under "Other publications", Page 2 - Exhibit M, line 2, change "1/2" to --1/2"--;

On Title page, under "Other publications", Page 2 - Exhibit N, line 2, change "1/2" to --1/2"-- and change "chekc" to --check--;

On Title page, under "Other publications", Page 2, column 2, line 19, change "table" to --tables--;

In Column 4, line 39, change "byway" to --by way--;

In Column 5, line 56, change "connector 23" to --T-connector 24--;

In Column 6, line 6, change "system I" to --system 1--;

In Column 6, line 25, change "main controller 45" to --main controller 5--;

In Column 7, line 43, after "injector 49." begin new paragraph.

Signed and Sealed this

Second Day of June, 1998

*Attest:*

BRUCE LEHMAN

*Attesting Officer*      *Commissioner of Patents and Trademarks*